April 5, 1966    C. F. BUSH    3,244,214
TUBELESS TIRES
Filed Dec. 16, 1963

INVENTOR.
CHARLES F. BUSH
BY
J.B. Holden
ATTORNEY 3,244,214
TUBELESS TIRES
Charles F. Bush, Cuyahoga Falls, Ohio, assignor to The Goodyear Tire & Rubber Company, Akron, Ohio, a corporation of Ohio
Filed Dec. 16, 1963, Ser. No. 330,878
1 Claim. (Cl. 152—354)

This invention relates to the construction of tubeless tires with a bias-cut carcass of any number of plies or construction. The inner carcass ply comprises an overlapped splice the underlap of which is held close to the carcass by stiffening the liner with short lengths of filamentary material. Shepherd 3,115,179 refers to the use of such a liner in radial-ply tires but makes no mention of there being any splice therein.

In the tire construction to which this invention relates, the air-retaining liner is of more uniform gauge than when a liner consisting entirely of elastomeric material is employed, over an overlapped splice in the inner ply of the carcass, and this stiffening of the liner reduces the diffusion of air through the tire. It is valuable for overlapped splices of all cord sizes measuring about .02 inch or more in diameter.

For various tires, often only two plies or larger cords are employed. In airplane tires and other tires a larger number of plies of larger or smaller cords may be required. The invention is applicable to tires of any number of plies, of any size, utilizing any number of beads.

Some air diffuses into, and sometimes through tubeless tires when inflated. Loss of air within the tire is undesirable not only because it reduces the air pressure within the tire and may possibly cause blisters to form, but primarily because it may cause ply separation, resulting in tire failure.

Tubless tires are provided with air-retainer liners. The composition of the elastomer used in these liners varies. Any elastomer may be used in the liner of this invention.

According to this invention there is incorporated in the liner material, discrete, discontinuous lengths of flexible filamentary material, such as rayon, nylon, wire, glass, or other non-porous filaments. These are short lengths, about ¼ inch to 1¼ inch in length. The weight of the filamentary material is about 1 to 10 percent and preferably about 2 to 6 percent of the weight of the elastomer used in the liner. Nylon flock is preferably employed, uniformly dispersed in the elastomer of the liner. The presence of this filamentary material within the liner produces several beneficial effects:

(1) It reduces the amount the underlap cords of the band-builder's and tire-builder's and preparation splices penetrate the liner, and this gives a liner of more uniform thickness which results in better protection over the cords and reduces the amount of air entering them and wicking through these cords.

(2) It prevents the cords from coming to the inner surface of the tire as a result of tension during shaping and fabric shrinkage, thereby giving better protection against air loss.

(3) It reduces the penetration of the liner into the carcass when the tire is inflated during curing in the mold, resulting in a liner of more uniform thickness which reduces air loss.

(4) It imparts structural strength to the liner, thereby giving added structural strength to the tire.

Thus, the advantages of providing filamentary material in the liner include preventing irregularities in the inner surface of the carcass at an overlapped splice penetrating the liner. A liner of more uniform thickness results and this gives more uniform results.

The filamentary material is advantageously incorporated in the elastomer of which the liner is formed on a mill after other compounding ingredients are added to the elastomer. If the filamentary material is added in a composite form, as short lengths of nylon cord, for example, it is broken down into individual filaments, and each is entirely surrounded by the elastomer while on the mill. The nylon may also be added in flock form consisting of individual filaments. The milling and calendering orientates the filamentary material in the sheet delivered from the mill. This places the filaments in the longitudinal direction of the flow of the liner sheet providing structural strength similar to that provided by continuous filaments. The sheet stock then better resists thinning out and the penetration of carcass plies.

Usually the liner covers the entire inner surface of the tire from bead toe to bead toe, and it may extend under the beads and serve as a chafer strip. When the tire is shaped the usual liner tends to thin out in various areas. Thus the thickness of the liner, as incorporated in the tire on the tire-building machine, for example, depends somewhat upon how much it will be thinned out when the tire is pantographed. Originally it may, for example, be .060 gauge up to .090 or even .120 gauge.

It is the filamentary material that is adjacent the surface of the liner next to the carcass that renders the most service, so in order to reduce the amount of filamentary material used, the filamentary material may be included in a first liner which is subsequently covered with a filament-free liner. If a thicker liner which contains filamentary material throughout it is desired, two filament-containing liner sheets may be used. For instance, assume that a .060-inch gauge liner is required. This may be formed entirely of elastomer containing filamentary material or such a liner of .030-inch gauge may be covered with a liner of .030-inch gauge containing no filamentary material; or two liners of .030-inch gauge may be used in which the filaments are aligned at opposing angles. Other combinations may suggest themselves, but the liner adjacent the carcass must contain discrete, discontinuous lengths of filamentary material.

The invention is further described in connection with the accompanying drawings, in which—

Figure 1:
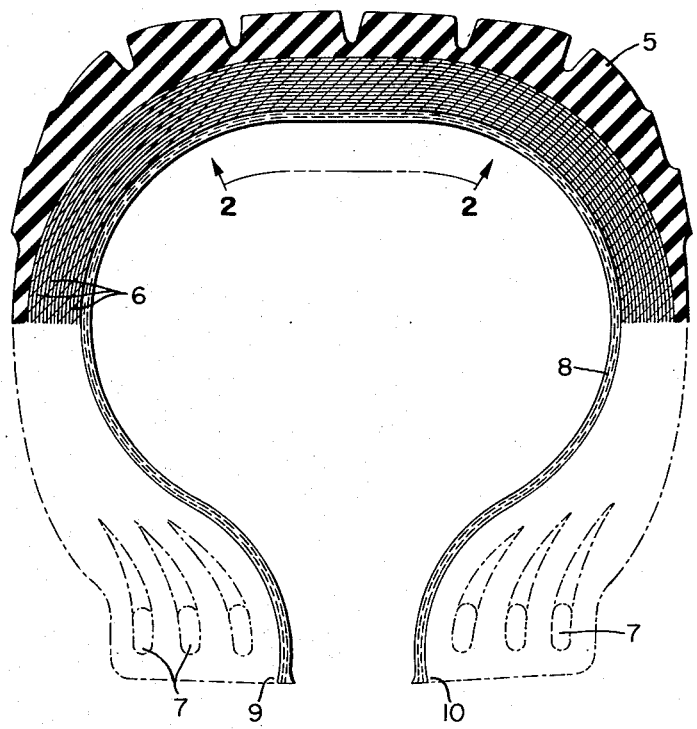
FIGURE 1 is a section through a tire composed of a large number of bias plies and having a liner containing short, discrete, discontinuous lengths of filamentary material orientated in a bead-to-bead direction.
Figure 2:
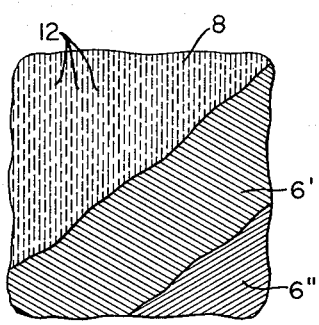
FIGURE 2 is an enlarged sectional view on the line 2—2 of FIGURE 1, illustrating that the tire has a single liner containing filamentary material aligned at 0°, although it may be at any angle from 0° to 90°.

The tire 5 of FIGURE 1 is merely illustrative of any usual tire construction. It is composed of a carcass with many bias cord plies 6, beads 7 on each side of the tire, and a liner 8 which extends from one toe 9 to the other toe 10. It is understood that the liner may extend under the beads to the outer surface of the tire. This liner contains short, discrete, discontinuous lengths of filamentary material 12, and as shown in FIGURE 2 these are orientated and are bias to the cords in the inner ply 6′ which are bias to the cords in the second ply 6″.

Figure 4:
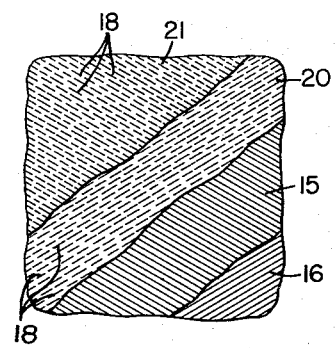
FIGURE 4 is an enlarged sectional view of the same, except that the filamentary material is orientated differently in the liners by cutting on the bias.
Figure 3:
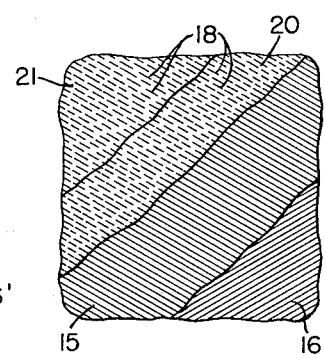
FIGURE 3 is an enlarged sectional view illustrating a tire with at least two carcass plies, and two liners each containing filamentary material.

As illustrated in FIGURES 3 and 4, a tire may have two liners containing filamentary material. In these figures, first and second plies 15 and 16 are biased cord plies. FIGURE 3 shows the filamentary material 18 in both liner sheets 20 and 21 orientated parallel to the cords in the first ply 15. Alternatively, it might be orientated parallel to the cords in the second ply. FIGURE 4 shows the filamentary material 18 biased in the two plies 20 and 21, with the filamentary material in the liner adjacent the carcass at opposing angles to ply 15. The filamentary material in the ply 20 might be orientated parallel to the ply 15.

Figure 5:
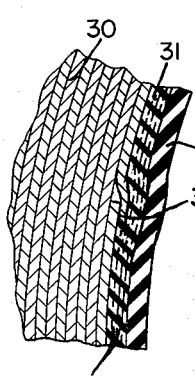
FIGURE 5 is an enlarged section through a portion of a tire having two liners only one of which contains filamentary material.

FIGURE 5 is a section through a tire carcass 30 with a liner 31 containing short, discrete, discontinuous lengths of nylon 32 or other organic filamentary material adjacent the first carcass ply, and inside of this an elastomeric liner 33 containing no filamentary material. The liner, stiffened with filamentary material, holds the underlap 35 of the inner ply close to the carcass and prevents it from separating any substantial distance from the carcass and penetrating the liner. The filamentary material may not be orientated, or it may be orientated circumferentially around the tire or on the bias at any angle.

The foregoing illustrations illustrate various configurations and constructions which are among those which may be utilized depending upon the specific tire requirements, size, shape, manufacturing processes and other variables necessitating some combination of the constructions shown and suggested.

The invention is covered in the claim which follows.

What I claim is:

A tubeless pneumatic tire which includes a carcass of bias-cut plies, the innermost of which includes an overlapped splice, and an elastomeric liner inside of the carcass which covers the underlap of the splice and contains short, discrete, discontinuous lengths of filamentary material entirely surrounded by the elastomer of the liner, which filamentary material gives relative permanence to the position and thickness of the liner when the tire is inflated during manufacture as a result of which the liner is of substantially uniform thickness and substantially uniformly impermeable to air when inflated, and interiorly of said liner an elastomeric liner containing no filamentary material.

References Cited by the Examiner

UNITED STATES PATENTS

| | | | |
|---|---|---|---|
| 2,688,996 | 9/54 | Loomis | 156—134 |
| 3,062,257 | 11/62 | Campbell | 152—354 |
| 3,115,179 | 12/63 | Shepherd | 152—354 |

ARTHUR L. LA POINT, *Primary Examiner.*